United States Patent
Schaffers et al.

(10) Patent No.: US 12,006,219 B2
(45) Date of Patent: Jun. 11, 2024

(54) THERMO-CHEMICAL PROCESSING OF COAL VIA SOLVENT EXTRACTION

(71) Applicant: University of Wyoming, Laramie, WY (US)

(72) Inventors: William Schaffers, Laramie, WY (US); David Bell, Laramie, WY (US); John Myers, Laramie, WY (US); Kaspars Krutkramelis, Laramie, WY (US); Paul Behrens, Laramie, WY (US)

(73) Assignee: UNIVERSITY OF WYOMING, Laramie, WY (US)

( * ) Notice: Subject to any disclaimer, the term of this patent is extended or adjusted under 35 U.S.C. 154(b) by 246 days.

(21) Appl. No.: 17/436,526

(22) PCT Filed: Mar. 12, 2020

(86) PCT No.: PCT/US2020/022300
§ 371 (c)(1),
(2) Date: Sep. 3, 2021

(87) PCT Pub. No.: WO2020/186011
PCT Pub. Date: Sep. 17, 2020

(65) Prior Publication Data
US 2022/0177312 A1     Jun. 9, 2022

Related U.S. Application Data
(60) Provisional application No. 62/817,184, filed on Mar. 12, 2019.

(51) Int. Cl.
C01B 32/184     (2017.01)
C08L 95/00      (2006.01)
(Continued)

(52) U.S. Cl.
CPC .......... C01B 32/184 (2017.08); C08L 95/00 (2013.01); C10B 57/08 (2013.01); C10G 1/042 (2013.01)

(58) Field of Classification Search
CPC ....... C01B 32/184; C08L 95/00; C10B 57/08; C10G 1/042
See application file for complete search history.

(56) References Cited

U.S. PATENT DOCUMENTS

| | | |
|---|---|---|
| 691,882 A | 1/1902 | Wright |
| 2,124,843 A | 7/1938 | Anderton |
| (Continued) | | |

FOREIGN PATENT DOCUMENTS

| | | |
|---|---|---|
| CN | 101280207 A | 10/2008 |
| CN | 101280208 A | 10/2008 |
| (Continued) | | |

OTHER PUBLICATIONS

Japan Final Notice of Rejection dated Apr. 25, 2023 in JP2020-515212.

(Continued)

*Primary Examiner* — Prem C Singh
*Assistant Examiner* — Juan C Valencia
(74) *Attorney, Agent, or Firm* — Leydig, Voit & Mayer, Ltd.

(57) ABSTRACT

Described herein are integrated thermochemical processes for the deliberate decomposition, extraction and conversion of coal into high-value products and goods via solvent extraction, chemical reaction and/or separation. The described systems and methods are versatile and may be used to generate a variety of intermediate, derivative and finished high value products including chemicals (aromatics, asphaltenes, naphthalenes, phenols and precursors for the production of polyamides, polyurethanes, polyesters, gra- (Continued)

phitic materials), polymer composite products (resins, paints, coatings, adhesives), agricultural materials, building materials, carbon fiber, graphene products and other materials that are substantially more valuable that the energy generated via combustion.

23 Claims, 7 Drawing Sheets

(51) Int. Cl.
C10B 57/08 (2006.01)
C10G 1/04 (2006.01)

(56) References Cited

U.S. PATENT DOCUMENTS

| | | | |
|---|---|---|---|
| 3,092,594 A | 6/1963 | Heiss | |
| 3,120,474 A | 2/1964 | Gorin | |
| 3,140,241 A | 7/1964 | Work et al. | |
| 3,240,566 A | 3/1966 | Bullough et al. | |
| 3,242,126 A | 3/1966 | Rickert | |
| 3,391,098 A | 7/1968 | Kemp | |
| 3,420,915 A | 1/1969 | Braithwaite | |
| 3,477,941 A | 11/1969 | Nelson | |
| 3,505,202 A | 4/1970 | Nelson | |
| 3,558,468 A * | 1/1971 | Wise | B01D 11/0203 208/429 |
| 3,583,900 A | 6/1971 | Gatsis | |
| 3,692,863 A | 9/1972 | Kmecak et al. | |
| 3,748,254 A | 7/1973 | Gorin | |
| 3,960,700 A | 6/1976 | Rosen et al. | |
| 4,012,311 A | 3/1977 | Greene | |
| 4,028,219 A | 6/1977 | Baldwin et al. | |
| 4,030,982 A | 6/1977 | Gorin et al. | |
| 4,056,460 A | 11/1977 | Malek | |
| 4,090,957 A * | 5/1978 | Leonard | C10G 1/04 208/426 |
| 4,097,361 A | 6/1978 | Ashworth | |
| 4,125,452 A | 11/1978 | Effron | |
| 4,145,274 A | 3/1979 | Green et al. | |
| 4,177,135 A * | 12/1979 | Rhodes | C10G 1/045 208/177 |
| 4,189,371 A | 2/1980 | Maa et al. | |
| 4,251,346 A | 2/1981 | Dry et al. | |
| 4,309,270 A | 1/1982 | Tyler et al. | |
| 4,318,959 A | 3/1982 | Evans | |
| 4,324,638 A | 4/1982 | Durai-Swamy | |
| 4,334,977 A | 6/1982 | Derbyshire et al. | |
| 4,356,077 A | 10/1982 | Che | |
| 4,358,344 A | 11/1982 | Sass et al. | |
| 4,374,725 A | 2/1983 | Whitehurst et al. | |
| 4,376,171 A | 3/1983 | Blount | |
| 4,415,429 A | 11/1983 | Stadelhofer et al. | |
| 4,415,431 A | 11/1983 | Matyas et al. | |
| 4,421,603 A | 12/1983 | Hall | |
| 4,490,213 A | 12/1984 | Anthony | |
| 4,547,282 A * | 10/1985 | Schindler | C10G 1/002 208/418 |
| 4,551,223 A | 11/1985 | Sadhukhan | |
| 4,563,197 A | 1/1986 | Steinberg et al. | |
| 4,617,105 A | 10/1986 | Miller | |
| 4,661,532 A | 4/1987 | Morin | |
| 4,687,570 A | 8/1987 | Sundaram et al. | |
| 4,842,719 A | 6/1989 | MacArthur et al. | |
| 4,854,937 A | 8/1989 | Meyer et al. | |
| 5,026,475 A | 6/1991 | Stuntz et al. | |
| 5,240,592 A | 8/1993 | Meyer et al. | |
| 5,705,139 A | 1/1998 | Stiller et al. | |
| 6,288,133 B1 | 9/2001 | Hagquist | |
| 8,226,816 B2 | 7/2012 | Kennel et al. | |
| 8,846,776 B2 | 9/2014 | Herrington et al. | |
| 9,074,139 B2 | 7/2015 | Quignard et al. | |
| 9,481,759 B2 | 11/2016 | Herrington et al. | |
| 9,692,469 B1 | 6/2017 | Clark et al. | |
| 2008/0017549 A1 | 1/2008 | Kennel et al. | |
| 2008/0230935 A1 | 9/2008 | Kennel et al. | |
| 2011/0094937 A1 | 4/2011 | Subramanian et al. | |
| 2011/0313094 A1 | 12/2011 | Yurovskaya et al. | |
| 2013/0104611 A1 | 5/2013 | Bauman et al. | |
| 2014/0024872 A1 | 1/2014 | Silverman et al. | |
| 2015/0128335 A1 | 5/2015 | Dehni | |
| 2015/0136659 A1 | 5/2015 | Barger et al. | |
| 2015/0141708 A1 | 5/2015 | Jan et al. | |
| 2015/0218078 A1 | 8/2015 | Mazanec et al. | |
| 2015/0305211 A1 | 10/2015 | Dhakate et al. | |
| 2016/0311728 A1 | 10/2016 | Swensen et al. | |
| 2018/0051397 A1 | 2/2018 | Hamaguchi et al. | |
| 2020/0332197 A1 | 10/2020 | Ackerman et al. | |
| 2022/0154075 A1 | 5/2022 | Adams et al. | |

FOREIGN PATENT DOCUMENTS

| | | |
|---|---|---|
| CN | 101643660 | 2/2010 |
| CN | 101845315 A | 9/2010 |
| CN | 101855327 A | 10/2010 |
| CN | 102229810 A | 11/2011 |
| CN | 102585870 A | 7/2012 |
| CN | 103146411 | 6/2013 |
| CN | 102219649 | 5/2014 |
| CN | 106543389 A | 3/2017 |
| CN | 107109263 | 8/2017 |
| JP | S58-113289 A | 7/1983 |
| JP | H04-502340 A | 4/1992 |
| JP | H06-299164 A | 10/1994 |
| WO | WO 9529969 | 11/1995 |
| WO | WO 2015/076973 | 5/2015 |
| WO | WO 2015/179806 | 11/2015 |
| WO | WO 2017049271 | 3/2017 |
| WO | WO 2018/004999 | 1/2018 |
| WO | WO 2018/188400 | 10/2018 |
| WO | WO 2019/055529 | 3/2019 |
| WO | WO 2020/186011 | 9/2020 |
| WO | WO 2020/186031 | 9/2020 |

OTHER PUBLICATIONS

Ashida et al. (2008) "Fractionation of coal by use of high temperature solvent extraction technique and characterization of the fractions," Fuel 87(4-5): 576-582.
Ashida et al. (2009) "Fractionation of brown coal by sequential high temperature solvent extraction, " Fuel 88(8): 1485-1490.
Atwood et al. (1977) "The TOSCOAL Process—Pyrolysis of Western Coals and Lignites for Char and Oil Production," Preprints of Papers American Chemical Society Division of Fuel Chemical 22(2): 233-252.
Bartle et al. (1979) "Structural analysis of supercritical-gas extracts of coals," Fuel 58: 413-422.
Burgess Clifford et al. (2008) "Production of Coal-Based Fuels and Value-Added Products: Coal to Liquids Using Petroleum Refinery Streams," Energeia 19(1): 1-4.
Colwell (2009) "Oil Refinery Processes: A Brief Overview," Process Engineering Associates, LLC: 36 pp.
Cortez et al. (1981) "Application of the Toscoal Process to the Electric Utility Industry," Tosco Corporation: 294-317.
Deshpande et al. (1984) "Extraction of coal using supercritical water," Fuel 63: 956-960.
Dhondt et al. (1978) "Union Oil's Shale Oil Demonstration Plant," Union Oil Company of California: 16-1 to 16-23.
Duncan et al. (Sep. 2017) "Attractiveness of Wyoming Powder River Basin (PRB) coal as a valuable resource from which to manufacture non-energy and fuel products," University of Wyoming, 16 pp.
Dutkiewicz (1982) "Commercializing the H-Coal™ Process," Proceedings from the Fourth Industrial Energy Technology Conference Houston, TX, pp. 174-180.
Funk (1981) "Separation of Heavy Oils Using Supercritical Fluids," Signal Research Center, Inc., pp. 148-153.
Hendrickson (1974) "Oil Shale Processing Methods," Quarterly of the Colorado School of Mines: 45-69.

(56) References Cited

OTHER PUBLICATIONS

Horner (Jun. 2017) "Wyoming Carbon Engineering Initiative," The Sixth International Advanced Energy Technology Conference, Xi'an, China, 18 pp.
Horner (Jun. 2018) "New Markets for Wyoming Powder River Basin (PRB) Coal by Addressing Carbon Management," 9th International Freiberg Conference on IGCC & XtL Technologies, Berlin, Germany, 26 pp.
Horner (May 2017) "New Markets for Coal Chemicals and Performance Materials," The 8th International Conference on Clean Coal Technologies, Cagliari, Italy, 20 pp.
Horner (Sep. 2018) "Green' Coal—A Reality Adoption of a Revolutionary Approach, " 7th Coal Summit & Expo, New Delhi, India, 26 pp.
Horner (Sep. 2019) "Coal—Its Potential for Diversification," India Energy Forum, 25 pp.
Horner (Sep. 2019) "Understanding & Extracting the Latent Value in Coal," 7th Roundtable Conference on Coal, New Delhi, India, 23 pp.
Huang et al. (1996) "Effect of Solvent Characteristics on Coal Liquefaction," Preprints of Papers, American Chemical Society, Division of Fuel Chemistry 41(3): 961-966.
Humphreys et al. (2012) "The Catalytic Hydrothermal Reactor Technology, Cat-HTR," Perspectives on Brown Coal 3: 3 pp.
Humphreys et al. (2012) "The Catalytic Hydrothermal Reactor Technology, Cat-HTR," Perspectives on Brown Coal, pp. 6-7.
Ignite Energy Resources (2009) "Transforming low-cost brown coal into high-valued fuels," pp. 1-31.
India Notice of Hearing & Objections dated Jun. 9, 2022 in IN 202017009734.
International Search Report and Written Opinion, dated Jun. 5, 2020, corresponding to International Application No. PCT/US2020/022338 (filed Mar. 12, 2020), 8 pp.
International Search Report and Written Opinion, dated May 12, 2020, corresponding to International Application No. PCT/US2020/022300 (filed Mar. 12, 2020), 8 pp.
International Search Report and Written Opinion, dated Nov. 7, 2018, corresponding to International Application No. PCT/US2018/050690 (filed Sep. 12, 2018), 8 pp.
Japanese Notice of Rejection dated Jul. 26, 2022 in JP 2020-515212.
Kershaw (1989) "Supercritical Fluids in Coal Processing," The Journal of Supercritical Fluids 2(1): 35-45.
Kershaw et al. (1984) "Extraction of Australian Coals with Supercritical Water," CSIRO Division of Applied Organic Chemistry, pp. 101-111.
Kershaw et al. (1993) "Structural Characterization of Coal-Tar and Petroleum Pitches," Energy & Fuels 7(3): 420-425.
Kobe Steel, Ltd. "Introduction of Hyper-coal," pp. 1-6 (at least as early as Jun. 11, 2018).
Li et al. (2003) "Effect of Acid Treatment on Thermal Extraction for 'Hypercoal' Production," Fuel Chemistry Division Preprints 48(1): 455-456.
LP Amina (2014) "Efficiency Improvements Through Emerging Polygeneration Technologies," International Advanced Coal Technology Conference 2014, Brisbane, Australia: 1-13.
Maciel et al. (2009) "Separating Asphaltenes from Lube Oil Through Supercritical Deasphalting Considering Experimental and Virtual Plants and Thermodynamic Analysis," 10th International Symposium on Process Systems Engineering: 771-776.
Making a New Pitch for Coal, The University of Utah, available online at https://unews.utah.edu/making-a-new-pitch-for-coal/, [posted Oct. 2016].
Meyer (1991) "The Charfuel® Coal Refining Process," Proceedings of the sixteenth biennial low-rank fuels symposium: 448-474.
Myers et al. (Sep. 2017) "Attractiveness of Wyoming Powder River Basin (PRB) coal as a valuable resource from which to manufacture non-energy and fuel products," 2017 International Pittsburgh Coal Conferences, Pittsburgh, PA, USA, Sep. 5-8, 2017, 16 pp.
Okuyama et al. (2004) "Hyper-coal process to produce the ash-free coal," Fuel Processing Technology 85(8-10): 947-967.
Ouchi et al. (1989) "Pyridine extractable material from bituminous coal, its donor properties and its effect on plastic properties," Fuel 68(6): 735-740.
Rahman et al. (2013) "Production and characterization of ash-free coal from low-rank Canadian coal by solvent extraction," Fuel Processing Technology 115: 88-98.
Ramaco Carbon (Jun. 2017) "'Coal to Cars' and a Few Other Things," 29 pp.
Ross et al. (1990) "The effects of hydrothermal treatment on Wyodak coal," Preprints of Papers—American Chemical Society, Division of Fuel Chemistry 35(2): 352-363.
Rotary Kiln, Source: https://en.wikipedia.org/wiki/Rotary_kiln?oldid=686121940, pp. 1-4. Accessed at least as early as Jun. 11, 2018.
Sasol (2011) "Future, now: Sasol Technology research and development," 17 pp.
Shui et al. (2012) "Hydrothermal Treatment of a Sub-bituminous Coal and Its Use in Coking Blends," Energy Fuels 27: 138-144.
Steinberg (1987) "The Flash Hydropyrolysis and Methanolysis of Coal With Hydrogen and Methane," Int. J. Hydrogen Energy 12(4): 251-266.
Sundaram et al. (1983) "Enhanced Ethylene Production via Flash Methanolysis of Coal," Process Sciences Division Department of Applied Science Brookhaven National Laboratory: 129-140.
Sundaram et al. (1986) "The direct use of natural gas in coal liquefaction," Prepr. Pap., Am. Chem. Soc., Div. Fuel Chem. 31(4): 77-84.
Tatterson et al. (1988) "Coal Flash Pyrolysis in a Free-Jet Reactor," Ind. Eng. Chem. Res. 27(9): 1606-1613.
U.S. Department of Energy Pittsburgh Energy Technology Center (1995) "Final Report on Design, Capital Cost and Economics for the Low Rank Coal Study," vol. 1A, 182 pp.
U.S. Department of Energy Pittsburgh Energy Technology Center (1995) "Final Report on Design, Capital Cost and Economics for the Low Rank Coal Study," vol. 1B, 182 pp.
USDOE Hydrogenates Coal with Methane, [2010] West Virginia Coal Association, available online at http://www.wvcoal.com/research-development/usdoe-hydrogenates-coal-with-methane.html, 2 pp.
Van Bibber et al. (2007) "Baseline Technical and Economic Assessment of a Commercial Scale Fischer-Tropsch Liquids Facility," National Energy Technology Laboratory: 1-76.
Winslow et al. (2009) "Direct Coal Liquefaction Overview Presented to NETL," Leonardo Technologies, Inc., 110 pp.
Work (1966) "The FMC Coke Process," Journal of Metals 18: 635-642.
Yang et al. (publicly available May 2016) "Preparation of pitch based carbon fibers using Hyper-coal as a raw material," Carbon (Sep. 2016) 106: 28-36.
Yoshida et al. (2002) "The effect of extraction condition on 'HyperCoal' production (1)—under room-temperature filtration," Fuel 81(11-12): 1463-1469.
Yoshida et al. (2004) "Effect of extraction condition on 'HyperCoal' production (2)—effect of polar solvents under hot filtration," Fuel Processing Technology 86(1): 61-72.

* cited by examiner

THERMO-CHEMICAL PROCESSING OF COAL VIA SOLVENT EXTRACTION

CROSS-REFERENCE TO RELATED APPLICATIONS

This patent application is a U.S. National Stage Application filed under 35 U.S.C § 371 of International Application Ser. No. PCT/US2020/022300, filed Mar. 12, 2020, which application claims the benefit of and priority to U.S. Patent Application No. 62/817,184 filed Mar. 12, 2019, each of which is hereby incorporated by reference in its entirely to the extent not inconsistent herewith.

BACKGROUND OF INVENTION

Coal mining and production represents a large, valuable industry in both the United States and abroad. The vast majority of this coal is combusted to generate energy. There is currently economic and political pressure providing a disincentive for the construction and operation of new coal-fired power plants. Accordingly, to further utilize coal as a resource beyond is value in combustion, it becomes increasingly attractive to investigate use of coal as a feedstock for other processes, including for the production of chemicals, plastics, building materials and products which may have significantly higher value than that of the energy produced by burn coal.

Research and development into coal as a feedstock for the generation of chemicals and other materials has been around for more than 50 years. Interest in this field has typically increased during periods in which traditional petroleum feedstocks have become expensive due to high oil prices, such as in the 1970's. For example, U.S. Pat. No. 4,346,077 discusses pyrolysis of coal to generate liquid hydrocarbons, porous carbon products and vapors. U.S. Pat. No. 9,074,139 describes generation of aromatic compounds from coal utilizing liquefaction and hydrocracking. Common amongst certain approaches and most conventional coal conversion technology is that coal is being converted into coal tars which can be utilized to manufacture unique hydrocarbon products and petrochemical feedstocks, as well as to mimic petroleum derived hydrocarbons (those processed through a petroleum refinery) such as fuels and petroleum based road paving and asphalt products. In doing so, appreciable quantities of coal derived solid porous carbon bi-products are co-produced can be utilized to make engineered products such as soil amendments and building and construction materials. These solid products may contain a high sulfur content, however are more usually further refined to improve purity and remove undesirable elements and compounds.

PCT application no. PCT/US2018/050690, filed Sep. 12, 2018 and published as International Publication Application No. WO 2019/055529 on Mar. 21, 2019, is directed to systems, methods and process conditions for making high value products from feedstocks derived from coal using a combination of solvent extraction and pyrolysis processes in any order. The methods and systems of this reference are characterized as highly branched, thereby potentially providing a commercially feasible process for generation of diverse classes of intermediate, derivative and finished high value products including chemicals, polymer composite products, asphalt products, agricultural materials, building materials, porous carbon products, carbon fiber and graphene products.

It can be seen from the foregoing that there remains a need in the art for systems and methods for the deliberate, thermochemical conversion of coal into intermediate, derivative and finished high-value products, thereby generating materials that are far more valuable than the equivalent coal-based energy produced via combustion. Further, separation and process systems and methods are needed that are specifically tailored and/or customized to treat coal and coal-based feedstocks to achieve effective transformation into products, that consider yields, efficiency, conversion rates and the manufacture of distinguished goods exhibiting desirable performance attributes that can be sold.

SUMMARY OF THE INVENTION

Described herein are integrated thermochemical processes for the deliberate decomposition, extraction and conversion of coal into high-value products and goods via solvent extraction(s), chemical reaction(s) and/or separation(s). The described systems and methods are versatile and may be used to generate a variety of intermediate, derivative and finished high value products including chemicals (aromatics, asphaltenes, naphthalenes, phenols and precursors for the production of polyamides, polyurethanes, polyesters, graphitic materials), polymer composite products (resins, paints, coatings, adhesives), agricultural materials, building materials, carbon fiber, graphene products and other materials that are substantially more valuable that the energy generated via combustion.

These systems and methods are specifically designed to be branched (i.e. process steps that together are amenable to produce wide ranging product types and specifications from the same feedstock), wherein the yields, composition and physical properties of products are selectively tunable by control of solvent and process conditions for extraction, chemical reaction and/or fractionation. The provided thermochemical processes convert a significant coal feedstock portion into value added products and extracts and in some embodiments provide an efficient means for converting a high percentage (e.g. greater than 30% dry basis, optionally greater than 60%) of the solid material into fluid products. Therefore, the systems and methods are highly adaptive to markets and responsive to product demand allowing for a high selectivity and optimization for increasing the demand and value of the actual intermediate, derivative and finished products relative to the feedstock.

These systems and methods are versatile for processing a range of coal-based feed stocks including run of mine coal and preprocessed coal-based feedstocks that have been subject to physical (e.g., pulverizing, grinding, sieving, mixing, formation of a slurry, etc.), thermal treatment (e.g., drying, heating, pyrolysis, flash pyrolysis, etc.) and/or chemical treatment (e.g., solvent extraction, chemical reaction, etc.). Solvent extraction steps of the invention include physical processes for separation of certain coal components from the solid phase into a solvent phase and/or chemical processes that convert coal components into new chemical species such as by hydrogenation reaction, aromatization reaction, cracking, isomerization, etc. Fractional steps of the invention are capable of tuning by variation of process conditions such as temperature, solution composition, etc. to provide control over products distribution and branching to high value products. These systems and methods are adaptable to generating and/or integrating recycle streams, such as recycle streams of solvent and mixtures of solvent generated from within the process or provided as a byproduct of a different process, to drive efficiency and low costs for commercial implementation.

In an embodiment, a method of processing a coal-based feed stock to make a high value product comprises: (i) providing the coal-based feedstock, wherein the coal-based feedstock is at least partially derived from coal, (ii) contacting the coal-based feedstock with one or more solvents under solvent treatment conditions for generating a soluble phase product and a remainder insoluble phase product, and (iii) fractionating the soluble phase product generating at least two fractions under conditions such that at least one of the fractionated products is the high value product. In an embodiment, the high value product us a non-fuel product, such as a product having value provided by properties, compositions and/or uses other than its ability to generate energy on combustion.

The processes and systems described herein are compatible with a range of coal-based feedstocks including a variety of run of mill coal types and coal that has been subject to one or more pre-processing steps. In an embodiment, the coal-based feedstock is at least partially derived from subbituminous coal or a derivative thereof. In an embodiment, the coal-based feedstock is generated by thermal treatment of coal or a derivative thereof, such as drying, pyrolysis, heating, etc. In an embodiment, the coal-based feedstock is generated by mechanical processing of coal or a derivative thereof such as grinding, pulverizing, sieving, changing particle size, formation of a slurry, etc.

Solvent treatment in the present methods and systems is useful for separating one or more components of a coal-based feed stock and/or chemically converting components of coal-based feed stock so as to generate useful intermediate, derivative or finished products. In an embodiment, the contacting step comprises extracting the coal-based feedstock with the one or more solvents, chemically reacting the coal-based feedstock with the one or more solvents or any combination of these. In an embodiment, the one or more solvents are one or more of an aliphatic solvent, an aromatic solvent, a polar solvent, a hydrogen donating solvent or any combination of these. In an embodiment, the one more solvents are tetralin (1,2,3,4-Tetrahydronaphthalene), 1-methyl-naphthalene, dimethylformamide, dimethyl sulfoxide, toluene or any combination of these. In an embodiment, the one or more solvents is a pure solvent. In an embodiment, the one or more solvent is a mixed solvent. In an embodiment, the one or more solvents at least partial comprises one or more recycle streams derived from a coal treatment process, petrochemical process or any combination of these.

Selection of the volume of solvent to volume of coal is beneficial in some embodiments to achieve target yields of the present processes and address efficiency and economic aspects of the present processes. In an embodiment, the solvent treatment conditions include a ratio of volume of solvent to volume of coal is selected from the range 1:1 to 100:1, optionally for some embodiments selected from the range 1:1 to 50:1, optionally for some embodiments selected from the range 1:1 to 20:1 and optionally for some embodiments selected from the range 1:1 to 10:1. In an embodiment, the contacting step is carried out for a duration selected from the range of 10 minutes to 60 hours, optionally for some embodiments 10 minutes to 20 hours, optionally for some embodiments 10 minutes to 10 hours, optionally for some embodiments 10 minutes to 1 hour.

In an embodiment, the contacting step is carried out at a temperature greater than or equal 20° C., optionally for some applications above 100° C., optionally for some applications above 200° C., optionally for some applications above 300° C., optionally for some applications above 350° C. In an embodiment, the contacting step is carried out at a temperature selected from the range of 20° C. to 500° C., optionally for some embodiments 100° C. to 400° C., optionally for some embodiments 200° C. to 350° C. In some embodiments, the contacting step is carried out at or near (e.g., ±10%) the boiling point temperature.

In an embodiment, the contacting step is carried out at a pressure high enough such that the solvent is present (at least a portion) as a liquid during the contacting step. In an embodiment, the contacting step is carried out at a pressure of 1 atm to 200 atm, optionally for some embodiments 10 atm to 150 atm, and optionally for some embodiments 10 atm to 100 atm. In an embodiment, the contacting step is carried out at a pressure high enough such that the solvent is present (at least a portion) as a dense supercritical fluid during the contacting step fluid. In an embodiment, the contacting step is carried out a super critical fluid conditions. In an embodiment, the contacting step is carried out using a counter current flow. In an embodiment, the contacting step is a counter current extraction process. In an embodiment, the contacting step sis carried out in a counter current extractor, for example, having a dosing pump such as a Moyno dosing pump and/or a flanged pipe reactor.

The present systems and processes are capable of providing useful yields of intermediates, derivative and/or finished products. In an embodiment, the contacting step converts at least 3% by mass of the coal-derived feedstock to the soluble phase product, optionally for some embodiments at least 10% by mass of the coal-derived feedstock to the soluble phase product, optionally for some embodiments at least 25% by mass of the coal-derived feedstock to the soluble phase product, optionally for some embodiments at least 50% by mass of the coal-derived feedstock to the soluble phase product, and optionally for some embodiments at least 75% by mass of the coal-derived feedstock to the soluble phase product. In an embodiment, the contacting step converts 3% to 95% by mass of the coal-derived feedstock to the soluble phase product, optionally 10% to 95% by mass of the coal-derived feedstock to the soluble phase product, optionally 25% to 95% by mass of the coal-derived feedstock to the soluble phase product, 50% to 95% by mass of the coal-derived feedstock to the soluble phase product, 75% to 95% by mass of the coal-derived feedstock to the soluble phase product.

In an embodiment, the contacting step is carried out as a flow through process, a batch process, a co-current process, a counter-current process or any combination of these.

Systems and processes of some embodiments includes one or more fractionation steps providing a flexible and efficient pathway to a range of intermediate, derivative and finished products. In an embodiment, the fractionating step is a partial precipitation, fractional crystallization, fractional freezing or any combination of these, thereby generating one or more one or more precipitated fractions and one or more remainder liquid phase fractions. In an embodiment, the partial precipitation, fractional crystallization, fractional freezing is carried out via flash precipitation. In an embodiment, the method further comprises cooling the soluble phase product, thereby causing one or more fractions to precipitate, thereby generating the precipitated fractions. In an embodiment, the soluble phase product is cooled at a rate selected to precipitate and recover greater than 50%, optionally greater than 75%, of the precipitated fraction. The invention is versatile with respect to the cooling rate used to generate precipitated fraction(s). For example, the present processes are compatible with essentially instantaneous temperature reduction, such as provided using a restriction to get a pressure drop. On the other hand, the present processes are also compatible with precipitation techniques cooling more slowly.

In an embodiment, the method further comprises isolating the one or more precipitated fractions from the one or more remainder liquid phase fraction. In an embodiment, the precipitated fractions are isolated via filtration including flow through filtration and/or batch filtration. In an embodiment, the cooling generates a plurality of precipitated fractions, wherein each precipitated fraction is characterized by a precipitation temperature range and optionally a remainder liquid phase product. In an embodiment, the precipitation temperature ranges of the precipitated fraction ranges from 20° C. to 600° C., optionally for some embodiments 100° C. to 450° C., optionally for some embodiments 100° C. to 360° C., optionally for some embodiments 100° C. to 300° C., and optionally for some embodiments 100° C. to 200° C.

In an embodiment, the 3% to 95% by mass of the coal-derived feedstock is converted into the precipitated fractions. The low end (e.g., 3% to 30%) of this range exemplifies, for example, certain extraction conditions with dimethyl formamide, and the high end of this range (e.g., 50%-95%) exemplifies high temperature, super critical tetralin extraction.

In an embodiment, the fractionating step further comprises decreasing the amount of solvent in the soluble phase product prior to or during the partial precipitation, fractional crystallization, fractional freezing or any combination of these. In an embodiment, the amount of solvent in the soluble phase product is decreased by up to 100% by mass, optionally up to 75% by mass, optionally up to 50% by mass, optionally up to 25% by mass, optionally up to 10% by mass and optionally up to 5% by mass.

In an embodiment, the amount of solvent in the soluble phase product is decreased by removal of solvent vapor. In an embodiment, the amount of solvent in the soluble phase product is decreased by flash evaporation and/or drawing off (e.g. pumping off) solvent vapor. In an embodiment, the method further comprises thermally treating any of the precipitated fractions.

In an embodiment, the fractionation conditions are tunable so as to achieve the precipitated fractions having one or more selected properties, such as chemical composition, average molecular weight, oxygen content, polycyclic aromatic hydrocarbon content, etc. In an embodiment, the fractionation conditions are selected such that the precipitated fractions are characterized by average molecular weights selected from the range of 50 Da to 1,050 Da, optionally 100 Da to 1,050 Da, optionally 200 Da to 1,050 Da, optionally 300 Da to 1,050 Da, optionally 500 Da to 1,050 Da and optionally 700 Da to 1,050 Da. In an embodiment, the precipitated fractions include one or more tetralin insoluble fractions and one or more a tetralin soluble fractions, for example at a temperature selected from 100° C. to 360° C. In an embodiment, the precipitated fractions include one or more a low molecular weight fractions characterized by a first average molecular weight of 300±10% (optionally ±20%) Da and one or more middle molecular weight fractions characterized by a second average molecular weight of 350±10% (optionally ±20%) Da and one or more high molecular weight fractions characterized by a third average molecular weight of 390±10% (optionally ±20%) Da. In an embodiment, the precipitated fractions include one or more low polycyclic aromatic hydrocarbon fractions, for example, having less than 100 ppm polycyclic aromatic hydrocarbon content, optionally less than 50 ppm polycyclic aromatic hydrocarbon content. In an embodiment, the precipitated fractions include one or more a high oxygen content fractions characterized by 78-82 wt. % carbon, 6-8 wt. % hydrogen, 0.6-1.2 wt. % nitrogen, 9-14 wt. % oxygen, and 0.4 to 0.5 wt. % sulfur.

The processes and system of the invention are useful for generating a range of high value products. In an embodiment, the high value products are non-fuel products having value derived from properties, compositions, and/or uses other than generating energy via combustion. In an embodiment, the high value products are one or more of: polymers or polymer precursors; asphaltenic intermediates and/or finished products; coal tar, distillates, pitch, bulk asphalt, paving asphalt, graphitic materials, carbon fibers, graphene; soil amendments; fertility products; building materials or any combinations of these. In an embodiment, the high value products are polyurethanes, polyamides, polyesters, epoxy polymers or precursors thereof.

In an embodiment, high value products are provided generated by the present methods. In an embodiment, the high value product comprises at least one component produced the present methods. In an embodiment, the high value product comprises a non-fuel product. In an embodiment, the high value product comprises a polymer or polymer precursor. In an embodiment, the high value product comprises one or more high value chemicals. In an embodiment, the high value product comprises a composite material. In an embodiment, the high value product comprises carbon fiber or a graphene product. In an embodiment, the high value product comprises a building material. In an embodiment, the high value product comprises a road, paving or roofing material. In an embodiment, the high value product comprises one or more soil amendments.

Without wishing to be bound by any particular theory, there may be discussion herein of beliefs or understandings of underlying principles relating to the processes, systems applications and methods disclosed herein. It is recognized that regardless of the ultimate correctness of any mechanistic explanation or hypothesis, an embodiment of the invention can nonetheless be operative and useful.

DETAILED DESCRIPTION OF THE INVENTION

Figure 1:
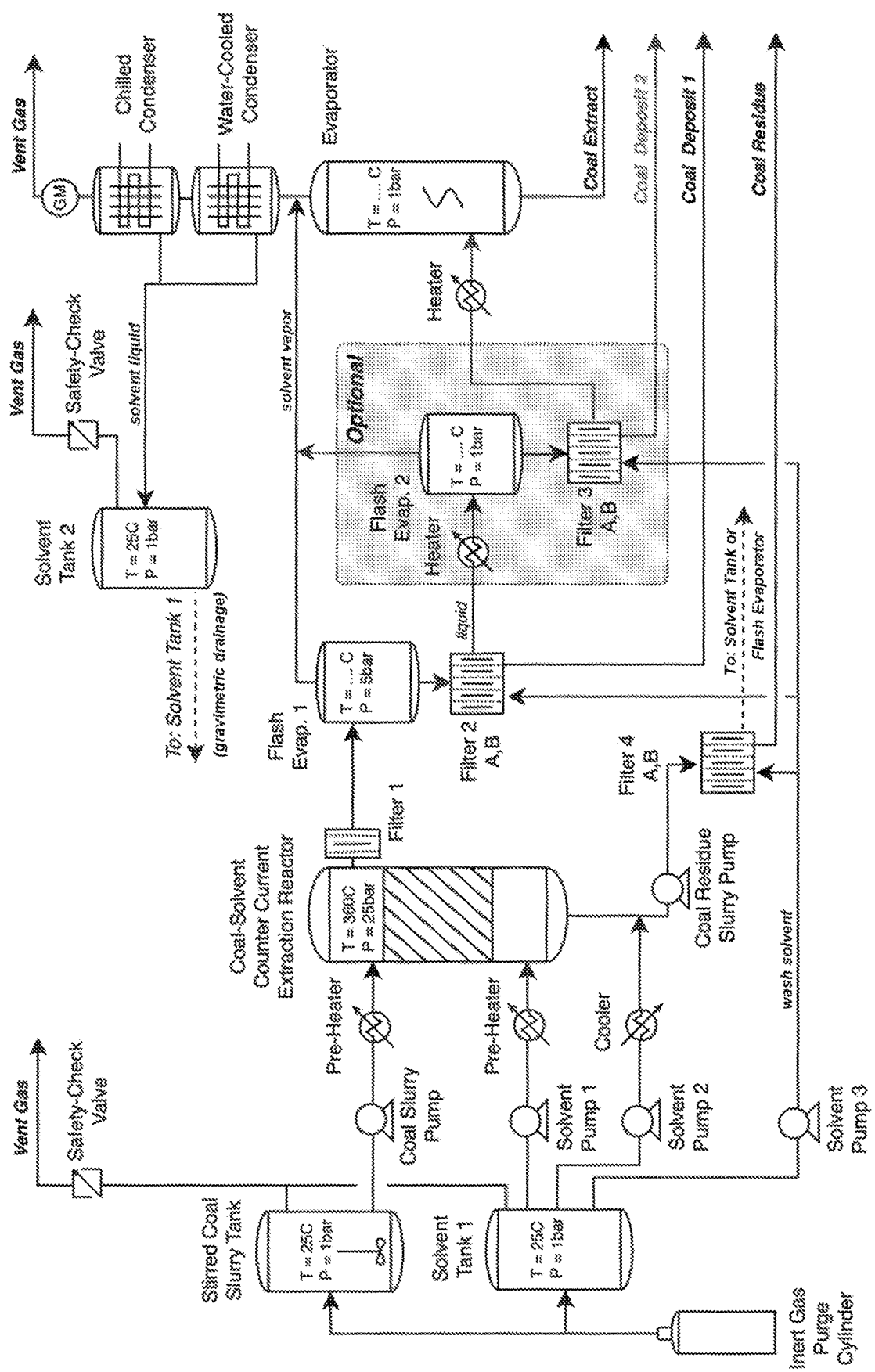
FIG. 1. Process flowsheet for the pilot plant.

In general, the terms and phrases used herein have their art-recognized meaning, which can be found by reference to standard texts, journal references and contexts known to those skilled in the art. The following definitions are provided to clarify their specific use in the context of the invention.

As used herein, "coal-based feed stock" refers to a feedstock at least partially derived from coal. A coal-based feed stock includes a solid, powder, slurry, liquid, residual, extract, fluid, mixture or other material that has been generated at least in part from a coal source, such as run of mine coal source and/or conversion products. For example, coal may be crushed into a powder prior to processing, sieved and/or formed into a slurry. A coal-based feed stock may be subject to various physical, thermal and chemical treatments known in the art to further facilitate processing of the feedstock, for example, by thermal treatment, mechanical treatment and/or chemical treatment to produce an intermediate. A coal-based feed stock (or intermediate/derivative product thereof) may be subject to pyrolysis and/or solvent extraction treatments. The feedstock may also act as a recycled stream from one or more of the downstream processes or intermediates (e.g. solid material remaining after solvent extraction) for augmentation, so that additional products, such as liquid products, may be promoted and/or enhanced by reprocessing with less valuable or unwanted intermediate products.

"Coal" refers to predominately solid hydrocarbons that may contain some amount of fluid material. Coal is generally composed of hydrogen, carbon, sulfur, oxygen and nitrogen, and optionally some other elements such as metals. Coal, as described herein, may refer to bituminous coal, subbituminous coal and lignite. Coal may also refer to ash or peat.

"Flash Pyrolysis" as described herein, refers to a thermal process in which a feedstock (or intermediate/derivative product thereof) is exposed to sufficient energy to rapidly heat the feedstock (or intermediate/derivative product thereof). Flash pyrolysis may, for example, provide heat or heat the material being processed to temperatures of greater than 750° C., greater than 900° C., greater than 1050° C., or optionally, greater than 1200° C. Flash pyrolysis may refer to a heating or resonance time of less than 60 seconds, less than 10 seconds, less than 5 seconds, less than 1 second, or optionally, less than 0.5 seconds. Flash pyrolysis may be performed in a vacuum, in the presence of air, or optionally, in the presence of a purified gas such as hydrogen or methane or syngas. It may also be performed in an inert atmosphere for example at very high temperatures greater than 1200° C.

"Solvent extraction" refers to the process of contacting a feedstock (or intermediate/derivative product thereof) with a solvent to facilitate the extraction and/or transformation of components of the material via chemical reaction(s) and/or mass transfer processes via solubility in the solvent. In some embodiments, solvent extraction is carried out by flowing a liquid solvent or mixture of solvents through, across or over, a feedstock (or intermediate/derivative product thereof). In some embodiments, solvent extraction is carried out as a batch process by bringing a feedstock (or intermediate/derivative product thereof) in physical contact with one or more solvents. As described herein, solvent extraction may utilize one or more solids in one or more solvent extraction steps, including in multistage solvent extractions in which the same or similar solvents are repeatedly used on a materials. Solvents, as described herein, may be pure solvents or mixtures including mixtures of liquid hydrocarbons generated by the processes described herein. Solvents, as described herein, may be mixtures of a number of solvents. Solvents may be recycled and reused as is known in the art. Solvent extraction may be at subcritical temperatures. Solvent extraction may be performed at reduced pressures, atmospherics pressures or increased pressures. Solvent extraction may be at carried out at supercritical pressures and temperatures.

"Solvent" as described herein refers to a liquid or a mixture of liquids having solubility and/or reactivity with regard to hydrocarbons or other species and molecules present in coal (or intermediate/derivative product thereof). Solvent may refer to a liquid organic solvent or hydrocarbon or a mixture of liquids, including organic solvents, hydrocarbons mixtures generally defined by boiling point ranges or other properties. Solvents may be polar, paraffinic, aromatic, alcohol, ionic, and/or hydrogen-donating in nature. In embodiments utilizing two or more solvents, solvents may be distinguished by composition, additives, molecular design, boiling point ranges or a combinations thereof. In some embodiments, the solvent is tetralin (1,2,3,4-Tetrahydronaphthalene) or 1-methyl-naphthalene. Solvents may be hydrogenated using a ready source of hydrogen, during their use and application including the recycle streams which may contain such solvents to rejuvenate them.

"High Value Coal Products" may describe chemicals and materials (both solid and liquid) generated by the processes described herein that are more valuable than the coal or feedstock at least partially derived from coal. High value products include non-fuel products, such as a product having value provided by properties, compositions and/or uses more valuable than its ability to generate energy on combustion. High value coal products may refer to liquid products generated from predominately solid coal. The high value coal products described herein may have a 1.5×, 2×, 3×, 5×, 10×, or optionally, at least 50× monetary value in comparison with the coal or raw coal material provided in the feedstock. High value coal products may refer coal products that are 1.5×, 2×, 3×, 5×, 10×, or optionally, at least 50× more valuable than the energy that would be produced via burning of the coal. High value coal products may refer to products that are not fuel (e.g. created for the purpose of burning to generate energy). Examples of high value coal products include polymers (e.g., polyurethane, polyesters, polyamides), high value chemicals (BTX, paraffins, olefins, asphaltenes), composite materials, carbon fiber, graphene, graphitic products, porous carbons, building materials, road, paving and roofing materials, and agricultural materials such as soil amendments. High value coal products may represent a fraction of the total material converted from the feedstock, for example, 50% of the total products on a dry basis, 70% of the total products on a dry basis, 80% of the total products on a dry basis, or optionally, 90% of the total products on a dry basis.

"Inert atmosphere" refers to an environment in which the gas phase is chemically inactive with the feedstock(s) present.

The terms "about" and "approximately" are used synonymously and refer to a property, dimension, parameter or condition that is within 20%, within 10%, within 5%, within 1%, or is equivalent to a reference property, dimension, parameter or condition. For example, a temperature of about 360° C. refers to a temperature having a value that is within 20%, 10% or 5% of 360° C.

Pressure values described herein are provided as absolute pressure values, unless otherwise indicated.

In an embodiment, a general purpose of the coal solvent extraction continuous process is to dissolve and recover low ash coal fractions. These fractions have value as a feedstock or as intermediates for the production of polymers, asphalt additives or carbon products such as fillers and performance enhancers in composite materials, carbon fiber and graphite. The undissolved residue fraction is also expected to have value as a soil amendment, for building and construction materials, or as a consumed coal based feedstock/intermediate to make other products.

The process is described in detail in Examples 1 and 2 below.

Figure 2:
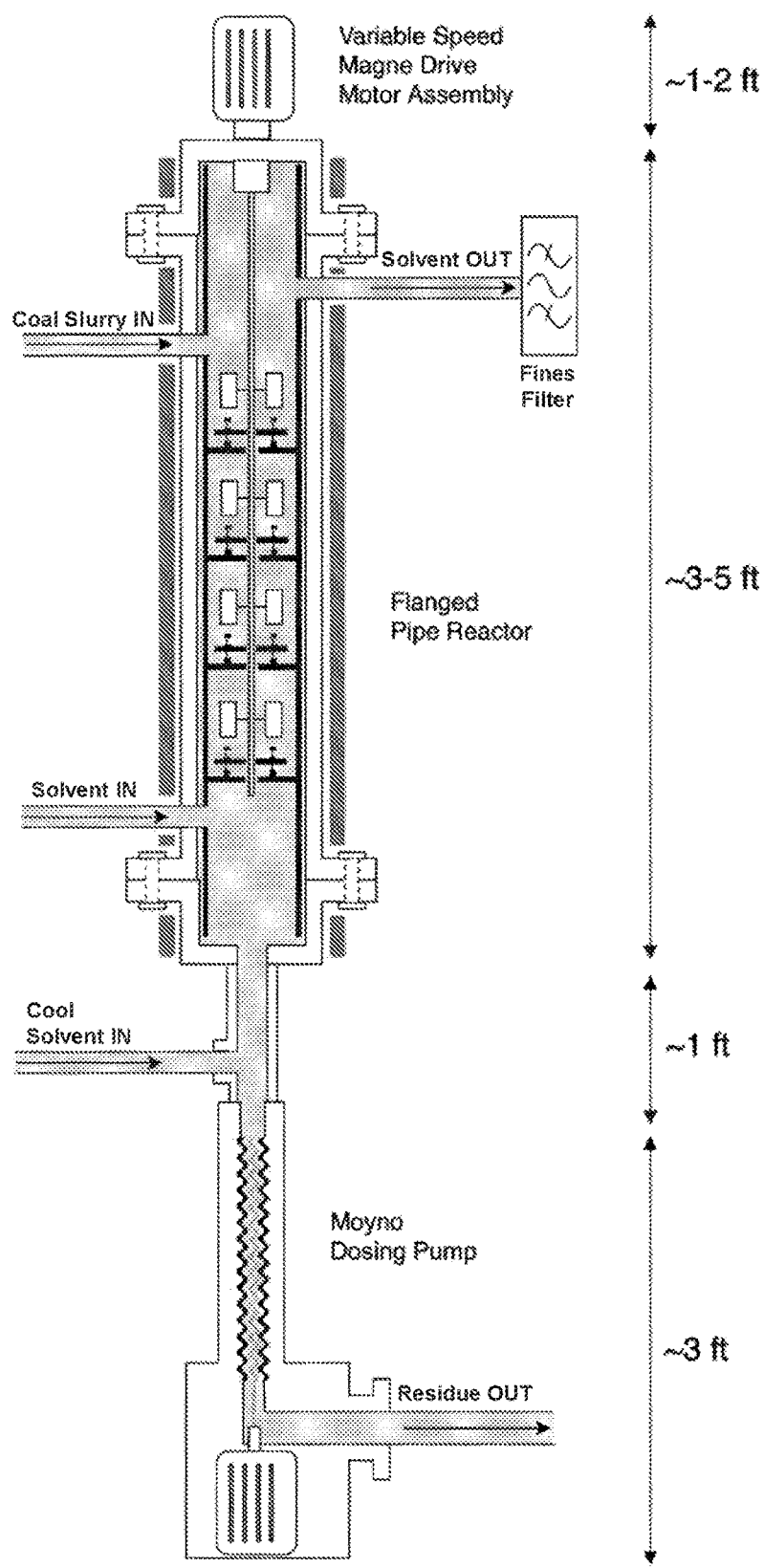
FIG. 2. Counter current coal-solvent extraction reactor design.

In an embodiment, the present methods and systems provides new processes and systems including:

1) An extraction reactor, such as a counter-current coal extraction reactor as shown in FIG. 2 of Example 2 below. Other coal solvent extraction processes use a co-current stirred tank, vessel or reactor to extract solvent treated solid and liquid intermediates from coal. The extractor described herein provides an example of a means for reducing the volume of solvent (e.g., solvent/coal ratio) needed to effectively extract effective/target yields of solid and liquid intermediate products from coal. Further, this feature allows for greater coal throughput, thereby improving the economic feasibility of the process. As recognized by one of skill in the art, the disclosed extractor is but one example of a large number of systems and techniques for solvent extraction including batch and flow processes for a wide range of feedstock compositions and scales. In some embodiments, the systems and methods use a solvent/coal weight ratio selected from 5:1 to 50:1. In an embodiment, for example, a batch extraction system use a 20:1 (±10%) solvent/coal weight ratio and optionally a 10:1 (±10%) solvent/coal weight ratio.

Figure 4:
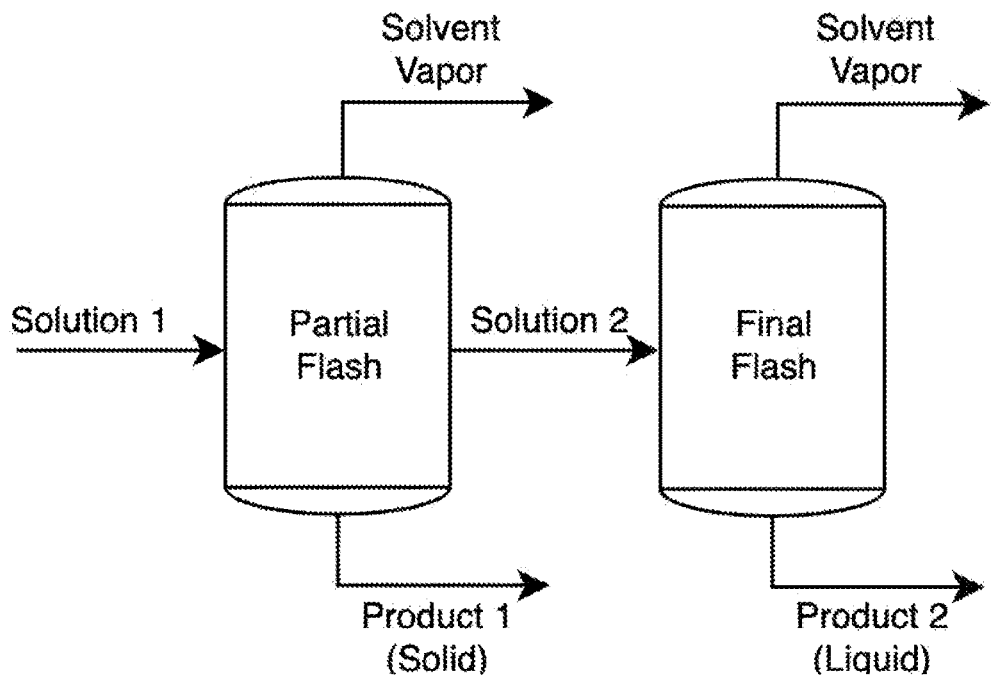
FIG. 4. Recovery of two extracted products from solution.

2) A staged product precipitation scheme, which is shown schematically in FIGS. 4 and 5 and as a part of the overall process in FIG. 1 of Example 2 below. As will be recognized by one or skill in the art, any number of stages may be used. A difference from previous coal solvent extraction processes is that previous processes primarily produced a fuel product, while a significant interest in the processes and systems herein is in producing intermediates and derivatives that constitute non-fuel products. The example stage precipitation scheme shown fractionates the dissolved coal compounds, thereby adjusting their properties for the intended uses. For example, control of solution composition such as amount of solvent and temperature provide an effective means for using fractionation to separate one or more precipitated fractions and/or unprecipitated fractions, constituting intermediates, derivative and/or finished products.

3) Applications for commercial implementation include pyrolyzing the residue from extraction (undissolved portion of the coal) and then distilling the pyrolysis liquids to provide a solvent for the coal solvent extraction process, for example, via one or more internal process stream flows include a recycle flow. In an embodiment, the solvent may be hydrogenated to give it hydrogen-donating properties.

Certain embodiments include providing a process for coal involving solvent extraction, fractionation and optionally pyrolysis. In some embodiments, process conditions are tunable to affect yields, composition and product properties, for example, to provide tunable control of the identity, properties and branching to products. In some embodiments, a coal-based feedstock is split into at least 4 fractions:

1). Residue: a component that doesn't dissolve in the solvent(s) under the solvent extraction conditions;
2). Deposit: a component that dissolves in the solvent(s) under the solvent extraction conditions and precipitates at a temperature of about 200° C.;
3) TI: a component that that dissolves in the solvent(s) under the solvent extraction conditions and is insoluble at room temperature (about 20° C.); and
4). DR: a component that that dissolves in the solvent(s) under the solvent extraction conditions and is soluble at room temperature (about 20° C.).

The following examples further illustrate the invention but, as will be generally understood by one having skill in the art, should not be construed as in any way limiting its scope.

Example 1: Solvent Extraction of Coal

This Example 1 provides methods and conditions for solvent extraction of coal-based feedstocks using tetralin and 1-Methyl-naphthalene (1-MN) solvents or any combination thereof. The experimental results provided herein illustrate that the present methods provide a flexible, thermo-chemical process for deriving a range of useful high value products from coal-based feedstocks with use of the solvent system.

Tetralin Solvent Extraction

Processes of the invention include treatment of a coal-based feed stock and/or intermediate with tetralin solvent, optionally followed by fractionation.

Pre-Extraction:

The present invention includes methods wherein a coal-based feed is prepared via one or more pre-exaction treatments and/or processes prior to solvent extraction and/or fractionation. Pre-treatments useful in some embodiments including mechanical treatment (e.g., pulverizing, grinding, sieving, mixing, formation of a slurry, etc.), thermal treatment (e.g., drying, heating, pyrolysis, etc.) and/or chemical treatment (e.g., solvent extraction, chemical reaction, etc.).

In an embodiment, prior to extraction, the coal is ground and sieved, for example, to 1,651-250 microns particle size range (10 to 60 mesh). The coal or a derivative thereof is then dried in an oven, for example, by heating to a temperature greater than 60° C. for a time period greater than 10 hours, such as heating to a temperature 60° C. to 120° C. for a time period 10 hours to 70 hours. In an embodiment, for example, the coal is dried at 90° C. for 48 hours to remove moisture.

In some embodiments, solvent extraction is carried out at atmospheric pressure in which coal is extracted using dimethyl formamide at or near its boiling point (±10%) wherein the extraction yield is lower than that observed for pressurized, higher temperature tetralin extractions. In an embodiment, the coal feedstock is pre-extracted with dimethyl formamide and then the remaining solids are extracted with tetralin.

Solvent Extraction:

The present invention includes methods wherein a coal-based feedstock is contacted with a solvent so as to achieve solvent extraction and/or chemical modification.

In an embodiment, for example, after drying, the coal-based feedstock is loaded into the reactor(s) and into the oven. The system is then pressurized with argon to a pressure of approximately 250 psi (17 bar). Tetralin is flowed through the system until the reactors are full of solvent. The reactors are then heated to approximately 360° C. at a rate of approximately 5° C. per minute. Once the system reaches a temperature of approximately 275° C., the tetralin flow is resumed and continues at the calculated flow rate throughout the duration of the test. The tetralin flow rate is calculated at approximately 0.1 ml per min per gram of dry coal in the reactor(s). The duration of the test is 2 hours starting when the reactor temperature, as measured by a thermocouple in the solvent line in the oven, reaches 350° C. This results in a solvent use to coal ratio of approximately 20:1 by volume.

In an embodiment, the tetralin flows through the reactors, then through a 3 micron random fiber stainless steel filter. The filter is heated to maintain a temperature of approximately 85° C. This filter collects the "Deposit" fraction of the extracted coal material. The extract is cooled with a heat exchanger prior to passing through the filters.

In an embodiment, after the 2 hour time period, the oven is shut off and the oven door opened to cool the reactors. They cool from 360° C. to around 50° C. in about 1 hour. The system is then blown out with argon and the oven reprogrammed to ramp to 250° C. at 5° C. per minute where it is held for 18 to 20 hours in order to dry the remaining solvent in the reactors. Argon at a rate of 50 ml per minute is flowed through the system during this drying period.

Once drying is complete, the reactors are removed from the oven and the extraction residue is removed. The residue is typically dry and free flowing and may resemble the coal that is initially loaded into the system. The Deposit material is removed by passing acetone or DMF through the system. This re-dissolves the Deposit material which is collected in a flask at the outlet.

Fractionation:

In an embodiment, the present methods further include the step of fractionation of the product(s) of solvent extraction or a derivative thereof. In some embodiments, the remainder insoluble phase is physically separated from the soluble phase. In some embodiments, the soluble phase is fractionated to generate two or more fractionation products, for example via partial precipitation fractional crystallization, fractional freezing, which may be carried out by a range of techniques well known in the art including but not limited to via flash precipitation. Collection of precipitated fractions may be carried out by a range of techniques well known in the art include but not limited to filtration, washing, purification and/or drying.

In some embodiments, for example, fractionation results in "Deposit", "TI" (tetralin insoluble) and "DR" (distillation residue) components which are separated from the solvent. The solvent containing the Deposit, either DMF or acetone, is distilled off the mixture using a evaporator such as a rotary evaporator, distillation tower, etc. The remaining residual material is the solid Deposit fraction. This fraction may be further processed, via purification, washing and/or drying (e.g. in an oven) to remove any remaining solvent.

The TI material is the solid fraction of the extracted material which has formed upon cooling the extract further to room temperature. The DR fraction is the material that remains soluble in tetralin at room temperature. The TI material which is insoluble at ambient temperature is separated from the solvent by room temperature vacuum filtering through a filter funnel (e.g., 1=50 micron, or 4-5.5 micron). This fraction is then washed with solvent, such as toluene, to remove residual tetralin and DR material. Optionally, the TI is then further purified, washed and/or dried, such as in a vacuum oven, to remove the remaining toluene and tetralin.

After filtering, the filtrate consists of tetralin and the soluble DR fraction. The tetralin may be distilled off to obtain the DR material. In an embodiment, this is done using a rotary evaporator. In an embodiment, the DR material remains liquid at distillation temperatures (approximately 120° C.) but solidifies at room temperature. The DR material is also further dried in a vacuum oven to remove remaining tetralin.

In an embodiment, the solvent is a mixture, such as the pyrolysis liquids used and/or generated in the process. In an embodiment, the solvent is one or more aromatic petroleum products.

In some embodiments, staged cooling is used to fractionate products. In some embodiments, for example for commercial production, the mixture pressure may be sequentially lowered thereby vaporizing a portion of the solvent, causing precipitation to occur primarily due to concentration of the dissolved species and secondarily by the temperature reduction that occurs when the solvent vaporizes.

Yields:

In an embodiment, the total yield of extracted material is typically between 40% and 45% on a dry coal basis. This means about 55% to 60% of the dry coal is left as residue. The yields of Deposit, TI and DR are primarily based on one large run. The yield of 41% is the yield of extracted material (with 59% residue yield). Of the 41% yield, 7.3% is Deposit, 7.8% is TI and 17.6% is DR. This makes a total of 32.7% leaving 8.3% unaccounted for, some of which are gases.

1-Methyl-Naphthalene (1-MN) Solvent Extraction

Processes of the invention include treatment of a coal-based feed stock with 1-Methyl-naphthalene (1-MN) solvent, optionally followed by fractionation. In some embodiments, the 1-MN solvent extraction follows a similar procedures as applied to the tetralin extraction, however, certain aspects of the process may be refined in view of use of the 1-MN solvent. In some embodiments, the 1-MN solvent is a mixture of 1-MN solvent and tetralin in varying quantities, optionally include one or more other solvents.

Described herein are solvent extractions of coal with 1-methylnaphthalene. The average yield of material remaining after extraction is 69% (±10%) by weight, providing a yield of extracted products (by difference) of 31% (±10%). These extracted products include gases, extracts (products soluble in 1-methylnaphthalene at ambient conditions) and Deposits (products insoluble in 1-methylnaphthalene at ambient conditions).

Additional experiments show that 19.7% (±10%) by weight of the initial dried coal went into the 1-methylnaphthalene soluble extract and is recovered when the solvent is stripped off. After drying, only 3.9% (±10%) of the coal formed the solid, deposit type material that formed at room temperature. This yield may not be representative, as the material deposited in the filter is not included.

The extract from the 1-methylnaphthalene coal extraction is more foamy than that from coal extraction using tetralin solvent. This is especially true in the early to middle stages of the extraction process once the extraction apparatus reaches operating temperature (350 to 360° C.). This may be due to a higher extraction of gas products or may be a property of the solvent. This behavior is observed during the experimental extraction run.

Further, described herein is a process in which residue from a 1-methylnaphthalene coal solvent extraction is subsequently extracted with super critical tetralin (500° C. and 1,250 psi). Typically, residue from a similar 2-stage extraction using only tetralin is dry and granular once the solvent is evaporated. It resembles the coal that was initially loaded into the reactor in appearance. In the case where the first stage of the extraction is with 1-methylnaphthalene, however, the residue remaining after the second stage tetralin extraction is different, for example, wherein residue has fused and had to be broken up to remove it from the reactor. The chunks of residue are very light and porous, similar to pumice. About 17% (±10%) by weight of this material remains from the coal that is initially started with in the 1-methylnaphthalene extraction.

Pre-Extraction:

The present invention includes methods wherein a coal-based feed is prepare via one or more pre-exaction treatments and/or processes prior to solvent extraction and/or fractionation. Pre-treatments useful in some embodiments including mechanical treatment (e.g., pulverizing, grinding, sieving, mixing, formation of a slurry, etc.) thermal treatment (e.g., heating, pyrolysis, drying, etc.) and/or chemical treatment (e.g., extraction, chemical reaction, etc.).

In an embodiment, the coal for the 1-MN extraction is ground, for example to 60 to 140 mesh (105 to 250 microns). The coal or a derivative thereof is then dried in an oven, for example, by heating to a temperature greater than 60° C. for a time period greater than 10 hours, such as heating to a temperature 60° C. to 120° C. for a time period 10 hours to 70 hours. In an embodiment, for example, drying is done in the reactor itself at 90° C. for 36 hours.

Solvent Extraction:

In an embodiment, temperatures and flow rates for 1-MN were the same as for the tetralin extraction as described above. One difference for the 1-MN process, however, is that the filter for the system is not heated and ran cooler than that for the tetralin process. In some embodiments, for example, the filter is at about 40° C. (±10%) rather than 85° C. (±10%) as used in some tetralin processes. This may result in a higher Deposit yield and lower TI yield than with the tetralin system.

Following extraction, the remaining 1-MN in the reactor is dried by ramping the oven to 245° C. at 5° C. per minute and holding there for 36 hours.

For the 1-MN run, a portion of the Deposit material is removed from the filter by physically scraping the outside of the filter. The remaining Deposit is removed by soaking the filter in DMF.

Fractionation:

Fractionation conditions for the 1-MN samples include filtering at cooler temperatures compared to the tetralin methods, such filtering at 40° C. (±10%).

Yields:

Under some conditions for 1-MN extraction, the overall yield of the extracted products is less than with tetralin. For example, 28% of the coal is extracted leaving 72% as residue in the reactor. In some embodiments, of the 28% extracted material, 2% is Deposit, 1.9% is TI and 20.7% is DR. This is a total of 24.6% leaving 3.4% unaccounted for, some of which is gas.

Example 2: Proposal for a Small, Continuous Coal Solvent Extraction

Pilot Plant

This Example provides systems, processes, and process conditions for an example continuous pilot plant that uses solvent extraction of coal to produce high value products. As will be generally understood by one having skill in the art, the processes, systems and conditions of this example may be scaled up via well-known techniques and systems to provide for commercial implementation of the disclosed solvent extraction and fractionation processes. Such scale up approaches are well-known in the art.

Introduction

Coal solvent extraction is a useful step in processing converting coal-based feedstocks into high value products. Products from coal solvent extraction may result in end products and/or intermediates useful to produce salable end products.

Over the last 80 years, several processes were developed to solvent extract coal to produce an ash-free solid fuel. These include the SRC-1 and Hypercoal processes. Coal liquefaction processes, such as the Exxon Donor Solvent process and the Shenhua Direct Liquefaction process, rely on a coal dissolution step. Unlike previous processes, the present approach seeks to make high value, non-fuel products. Consequently, an aspect of the design and operation of this pilot plant is to produce suitable intermediates, derivatives and finished high value products for non-fuel applications.

The pilot plant throughput is initially set at 4 lbs/hour coal feed. This small size address as material handling issues with feedstocks and products. A typical pilot plant run is expected to last at least 12 hours. As will be readily understood, the scale, dimensions, components and process conditions described herein can be adapted to large scale commercial implementation via well-known systems and techniques in the art.

Process Description

Overall Flowsheet and Coal Feed

FIG. 1 shows a simplified flowsheet for the pilot plant. Coal sufficient for a 12 hour run is batch loaded into the feed slurry tank, along with sufficient solvent to produce a pumpable slurry. In an embodiment, the feed tank is at ambient temperature and pressure. Optionally, an agitator mixes the feed slurry to keep it at a relatively uniform composition. The feed tank may be covered, but can be opened to reload the tank. A vent line attached to the tank cover m minimizes vapor exposure to operators and other building occupants.

In an embodiment, the feed pump is a Moyno-style progressive cavity pump, which is capable of pumping high solids slurries. The feed pump mat have a variable speed drive to control the feed rate.

Extraction Reactor

In the example batch experiments, solvent flows at a rate, optionally a constant rate, through a cylinder packed with coal until the produced liquid starts to clear, indicative that no more coal components are being extracted. This results in a very high solvent/coal ratio, about 20:1, and a 2 hour extraction time. Other solvent coal ratios and extraction times are potentially useful in the present reactor, such as a solvent ratio (volume solvent to volume coal) selected from the range of 5:1 to 100:1 and extraction selected over 0.5 hours to 100 hrs. A reduction in the solvent/coal ratio may be desirable in some embodiments to reduce the cost of coal extraction and may reduce the extraction time. To make extraction more efficient, a counter current extraction reactor may be utilized, as shown in FIG. 2. The design for this component may vary, but for illustrative purpose only, herein assumes that a 10:1 solvent/coal ratio will be used, and that the extraction time will be about one hour. The extractor operates at about 360° C., which is the same temperature used for at least some of the batch experiments. The extractor temperature is maintained by a thermal control system, such as an electric clamshell heater. In some embodiments, the extractor pressure may be to be 13.25 bar or higher to keep the solvent in the liquid state. As will be generally understood by one of skill in, a variety of temperature, pressure, and flow rate conditions are compatible with the present systems and methods.

Coal slurry is pumped to into the extraction reactor, for example, via or proximate to the top of the reactor. In an embodiment, the reactor is designed as a countercurrent extractor, with solids entering the extractor near the top of the vessel and falling down through the vessel. Most of the solvent (aside from the solvent used to slurry the feed coal), enters the extraction reactor near the bottom of the vessel, so liquid flows up the vessel, contacting the solids falling down the vessel. A set of agitators such as agitator paddles on a common shaft, and static baffles between sets of agitators, improve solid/liquid contacting. The agitators may be driven by a variety of methods such as a variable speed drive, and the rotational speed will need to be adjusted in some of the early pilot plant runs to find a workable speed. Higher rotational speeds may improve solid/liquid contacting, but in some instances may interfere with coal settling, which is needed to direct the solids down through the extractor. Coal residue is removed from the bottom of the extraction reactor as a slurry, which may be filtered. In this embodiment, the solution, consisting of most of the solvent and the dissolved coal species, flows out of the top of the vessel to the separation train.

Separation Design Considerations

Figure 3:
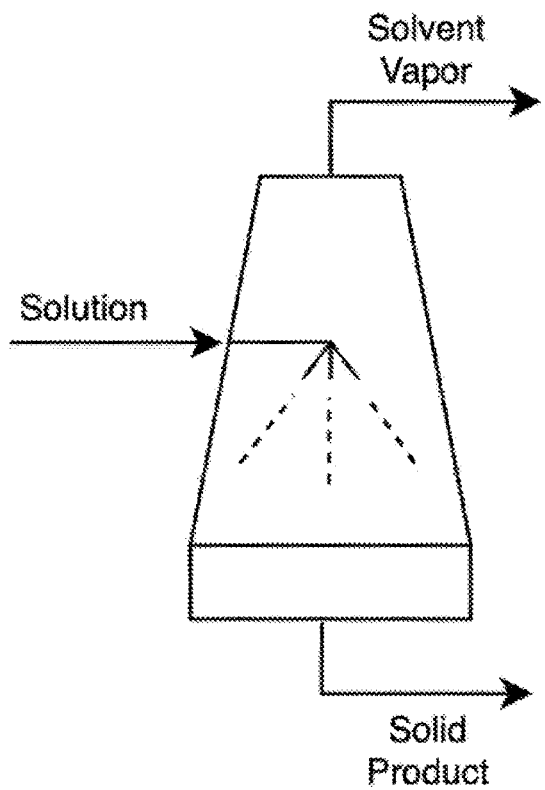
FIG. 3. Recovery of a single extracted product from the extraction solution.

In some embodiments, the solution leaving the extractor is separated into the extracted product and a recycle solvent. An approach for carrying out the separation is shown schematically in FIG. 3, in which the solution is flashed to produce solvent vapor and a relatively low vapor pressure product. This approach is compatible, for example, with a pilot plant wherein the heated, pressurized solution is sprayed into an atmospheric pressure chamber to produce solvent vapor and the product, which consists of small, dry, solid particles.

The solution from the extractor contains a wide range of dissolved coal components with varying degrees of solubility, boiling points, and molecular weights. This can be used to fractionate the extracted product into multiple product streams. An example, scheme to yield two extracted products is shown in FIG. 4.

Partial precipitation can be achieved by techniques well-known in the art such as by cooling the solution and/or by evaporating a portion of the solvent. In batch experiments, for example, the solution, produced by extracting at about 360° C., leaves the extraction oven through heat-traced tubing at about 200° C., and then enters an uninsulated cartridge filter. The solution passing through filter cools to ambient temperature, creating a cloudy suspension. These experiments are set up in a similar manner to some of the experiments, which refer to the solids captured by the filter "deposit" while the dissolved species passing through the filter are called "extract." The "extract" is further fractionated by filtering this suspension at ambient temperature. In an embodiment, for example, the resultant material is further separated into "tetralin insolubles" and "tetralin solubles." In this embodiment, therefore, temperature is used to fractionate the extracted materials into three solid products, "deposit," "tetralin insolubles," and "tetralin solubles."

In some embodiments, a staged reduction in temperature (resulting in pressure reductions) or partial evaporation of solvent is used to fractionate the dissolved coal into any number of product streams. A reason for doing this is to optimize the properties of the solvent extraction products so that high quality final products can be made and isolated. For example, the production of a step polymer, such as polyurethane, may in some embodiments require molecules with at least two reactive functional groups per molecule (in this case, a polyol). These molecules are some of the less soluble components in the extracted coal, so they are more likely to be found in the deposit product rather than in the other product streams. In practice, therefore, process conditions may be adjusted to produce higher quality intermediates.

Figure 5:
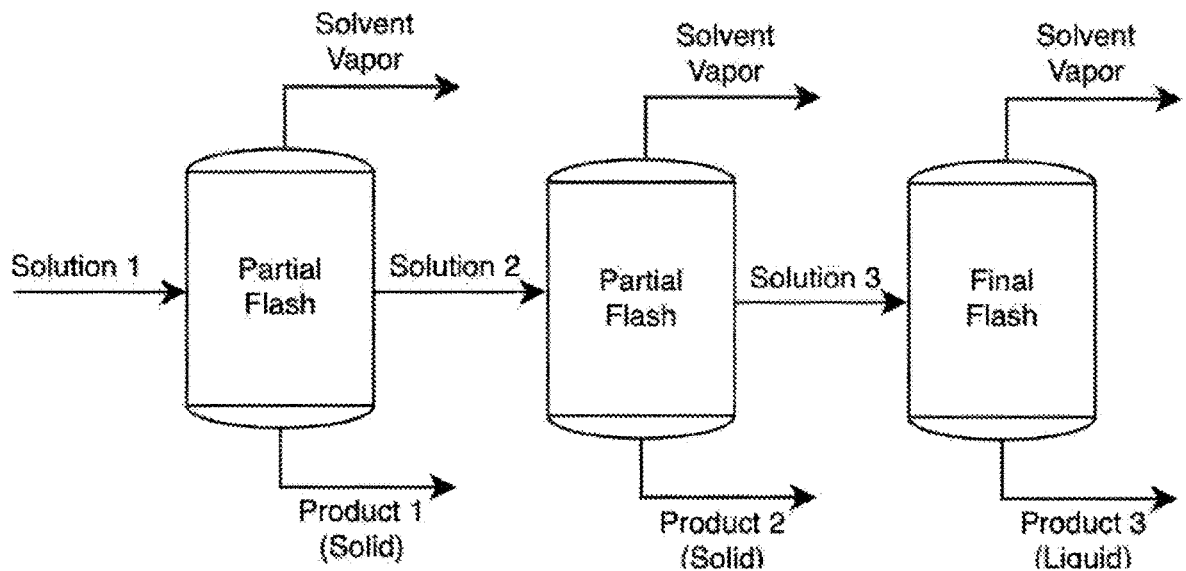
FIG. 5. Recovery of three extracted products from solution.

In an embodiment, the pilot plant is designed such that three extraction products are produced, as illustrated in FIG. 5. This design allows manipulation of the stages to produce a "heart cut" middle product (Product 2) with a carefully controlled range of properties, such as chemical compositions, solubilities, molecular weights. In some embodiments, two extraction products are generated, to keep the operation of the pilot plant relatively simple. Flash evaporator 2 may be provided with flash evaporator 1 to serve as a backup unit, if needed, or to implement the separation scheme shown in FIG. 5. The pilot plant may be modified to further fractionate products if needed.

In small scale pilot plants, hot materials rapidly cool to ambient temperature unless there is a deliberate attempt to keep the material hot. Large commercial plants, however, have much lower surface/volume ratios, so cooling by heat loss to the ambient environment is insignificant. At the large scale, active cooling may be employed to achieve a significant cooling rate. Using indirect heat transfer (heat exchangers) to cool liquids that are simultaneously precipitating solids may be problematic, because the precipitated solids may foul heat transfer surfaces. There are solutions to this problem, such as scraped surface heat exchangers, but these tend to be resource intensive.

Another approach at large scale is to drop the pressure of the solution, which causes a portion of the solvent to flash. This concentrates the remaining solution, and also lowers the temperature of the solution due to the heat of vaporization. Using this method, there are no heat transfer surfaces to foul. In an embodiment, the pilot plant is to drop the pressure of the solution from the extractor from about 13.25 bar to about 5 bar, which will vaporize about 70% of the solvent and drop the temperature from 360° C. to about 291° C. The precipitated solids are expected to be similar to the deposit fraction produced by the batch experiments. Since the partial precipitation conditions differ, the product yield and some product properties may differ. The flash conditions may be varied to alter the product yield and properties.

Figure 6:
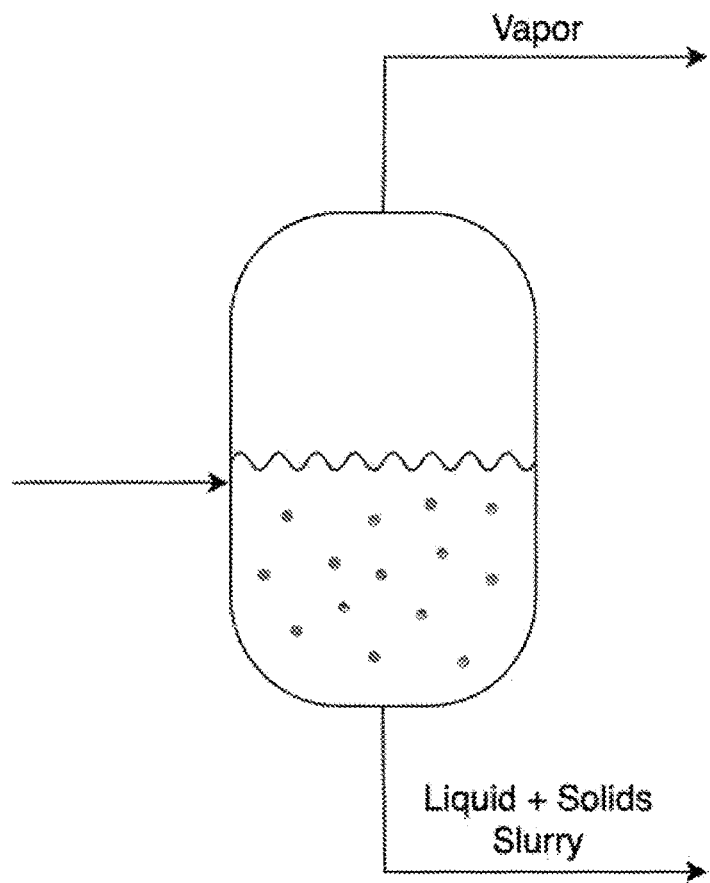
FIG. 6. A drawing of a typical flash precipitator unit.

A drawing of an example flash vessel is shown in FIG. 6. The design of this vessel is influenced by evaporative crystallizer design. One major difference is that precipitation in the flash evaporator may produce a non-crystalline product. Another difference is that the enthalpy of vaporization is provided by the feed solution, rather than by indirect heat transfer to the slurry. As in an evaporative crystallizer, solid/liquid separation downstream of the precipitator is easier if large particles are produced, as opposed to a larger number of small particles with the same total mass. Deposition of solids onto pre-existing particles, leading to particle growth, is thermodynamically favored if the supersaturated liquid is only a short distance from existing particle surfaces. If the supersaturated liquid is a long distance from existing surfaces, then spontaneous nucleation may occur, which leads to the formation of a larger number of smaller particles. To encourage growth of existing particles, rather than the formation of new nuclei, the feed to the precipitator may be discharged into a recirculating slurry.

Figure 7:
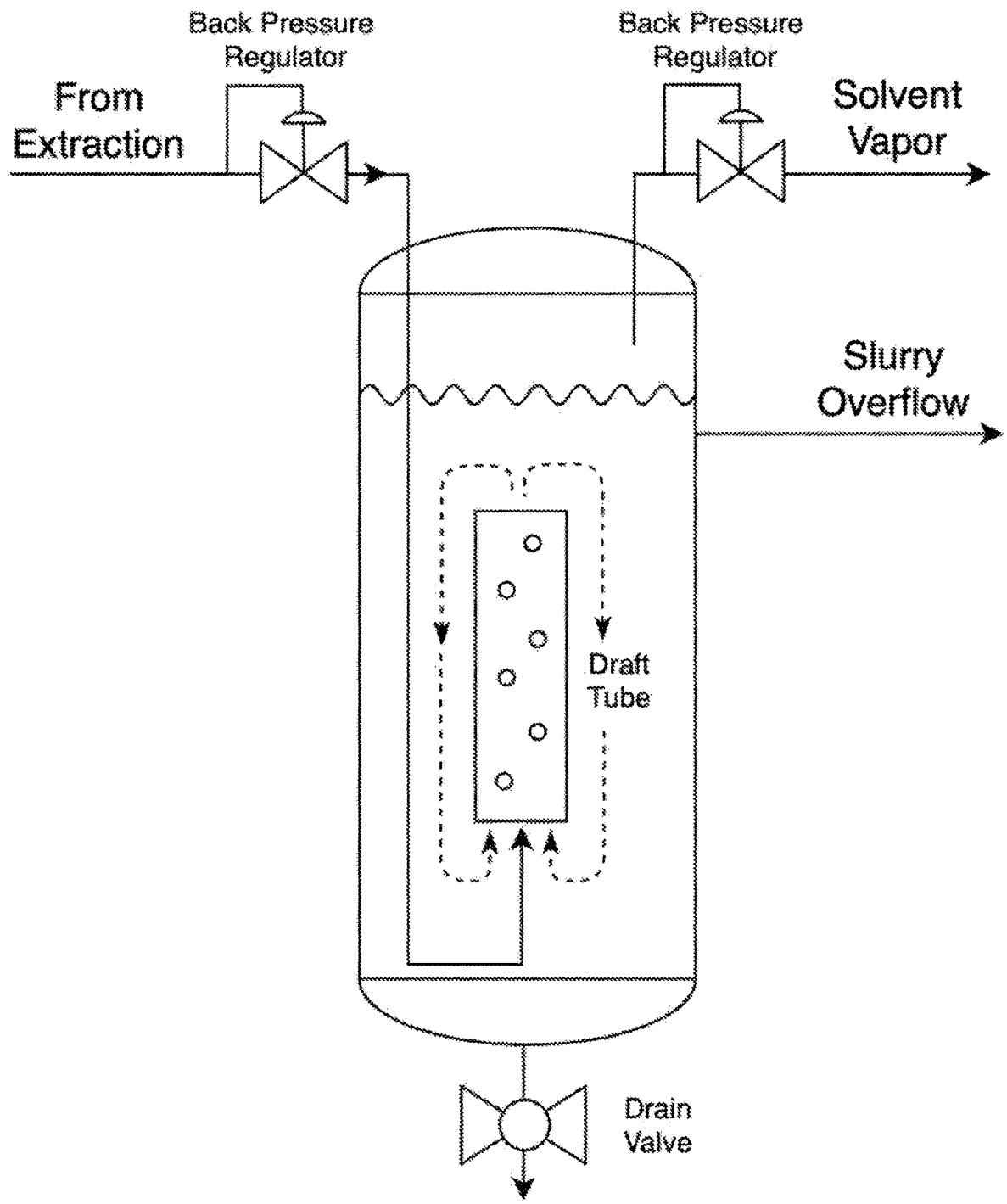
FIG. 7. A drawing of a flash evaporator unit with a draft tube for a controlled nucleation. The solid precipitate is recovered by filtering the slurry overflow.

Shown in FIG. 7, is an example flash evaporator design where rising bubbles in the central draft tube provide an upward lift, while slurry leaving the top of the draft tube flows downward through the annular space. The slurry may, alternatively, be stirred using an agitator, but the high shear rates near the agitator blades may break particles. Therefore, the draft tube design is a gentler method of circulating slurry in the vessel, avoiding particle breakage.

Pressure on the extraction vessel may be maintained by techniques and processes known in the art, including a backpressure regulator on the line connecting the extractor and the flash evaporator. This stream may contain a few small particles, which may interfere with the operation of the regulator. The pressure (and thereby the temperature) of the evaporator is set by a backpressure regulator on the solvent vapor leaving the evaporator. It is assumed that the slurry leaving the evaporator is discharged into a filter that has a feed pressure only slightly lower than the precipitator.

In an embodiment, the final flash is assumed to be near ambient pressure and about 207° C., the atmospheric boiling point of tetralin. This step is expected to nearly completely vaporize all solvent remaining in the solution. To minimize solvent in the flashed product, heat may optionally be added to the flash. Unlike the Hypercoal process, the remaining dissolved product is recovered as a liquid rather than as a solid from this final flash. This is because the higher melting components are removed as solids by the partial flash units (Coal Deposit 1 and Coal Deposit 2). In some embodiments, the extract, which roughly corresponds to the product from this flash, has a softening point of about 80° C. The melting point of the final product from the pilot plant may vary according to the conditions used in the partial evaporators. Since the product is liquid, this stage may optionally be operated as a vapor/liquid flash rather than the spray system used by the Hypercoal process.

The liquid state of the final flash product facilitates further product separation. For example, the system may run a bench-top version of a de-asphalting process, in which the flash product is mixed with an alkane to precipitate the asphaltenes.

Recycled Solvent Treatment

In the commercial plant, the recycle solvent (or a slip stream of recycle solvent) may be hydrogenated to convert naphthalene back into tetralin. About 1 to 2% of the feed tetralin is estimated to be converted to naphthalene per pass, so the solvent can be recycled several times before the tetralin concentration drops to a level that significantly affects extraction.

A small fraction of the coal may be converted to low-boiling compounds that will be recycled with the solvent. The solvent may be recycled several times to accumulate a significant concentration of these compounds in the solvent. A portion of the solvent may then be distilled and the distillates will be analyzed to determine which compounds are produced and to estimate their yields.

Solvent added to the feed slurry tank may be either recycled solvent from the prior run or fresh tetralin. Recycled solvent may be used to allow naphthalene and coal-derived compounds to build up in the solvent. Fresh solvent may be used to reduce the level of impurities in the solvent loop.

Figure 8:
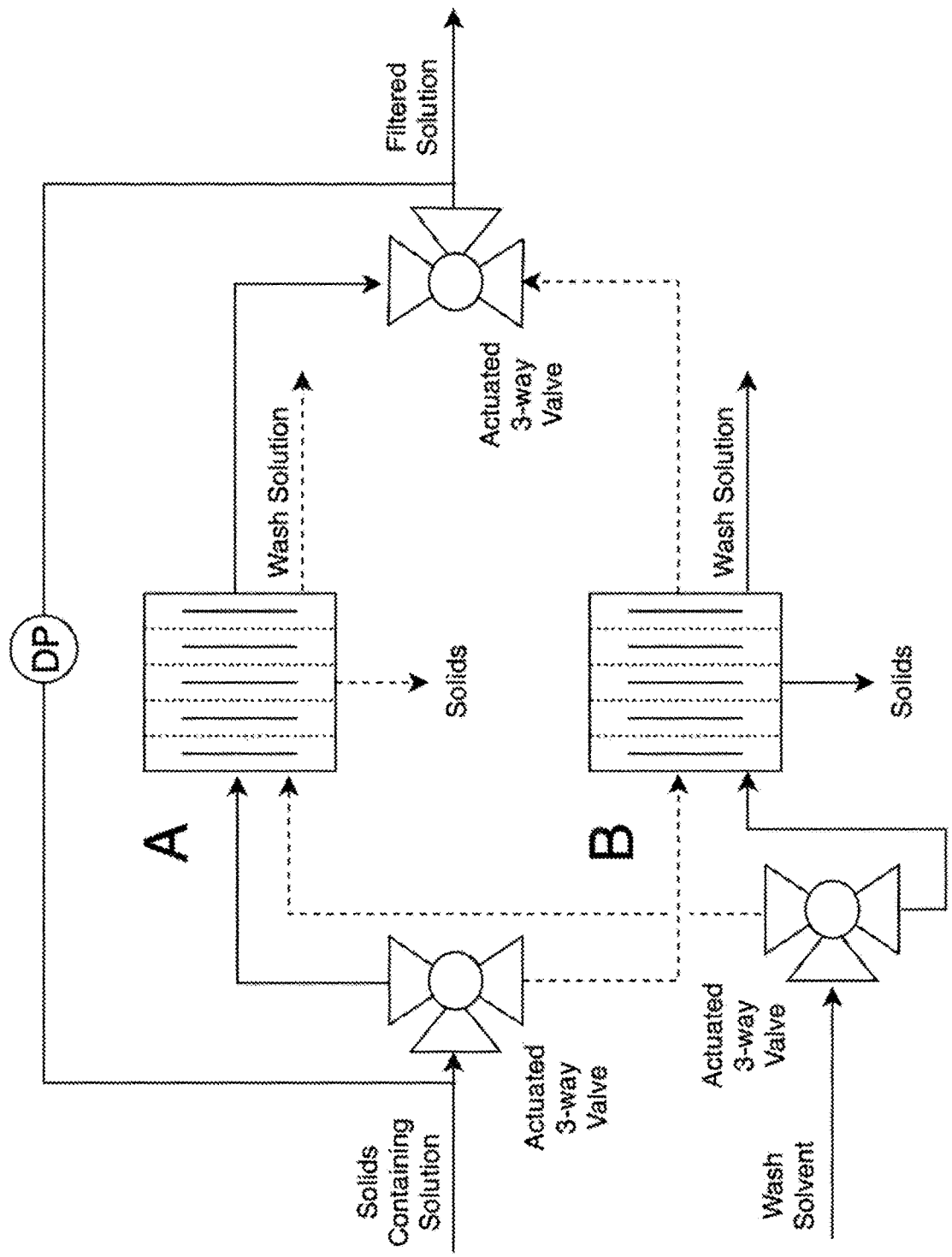
FIG. 8. Schematic of a parallel filtering process for ensuring a continuous operation.
Figure 9:
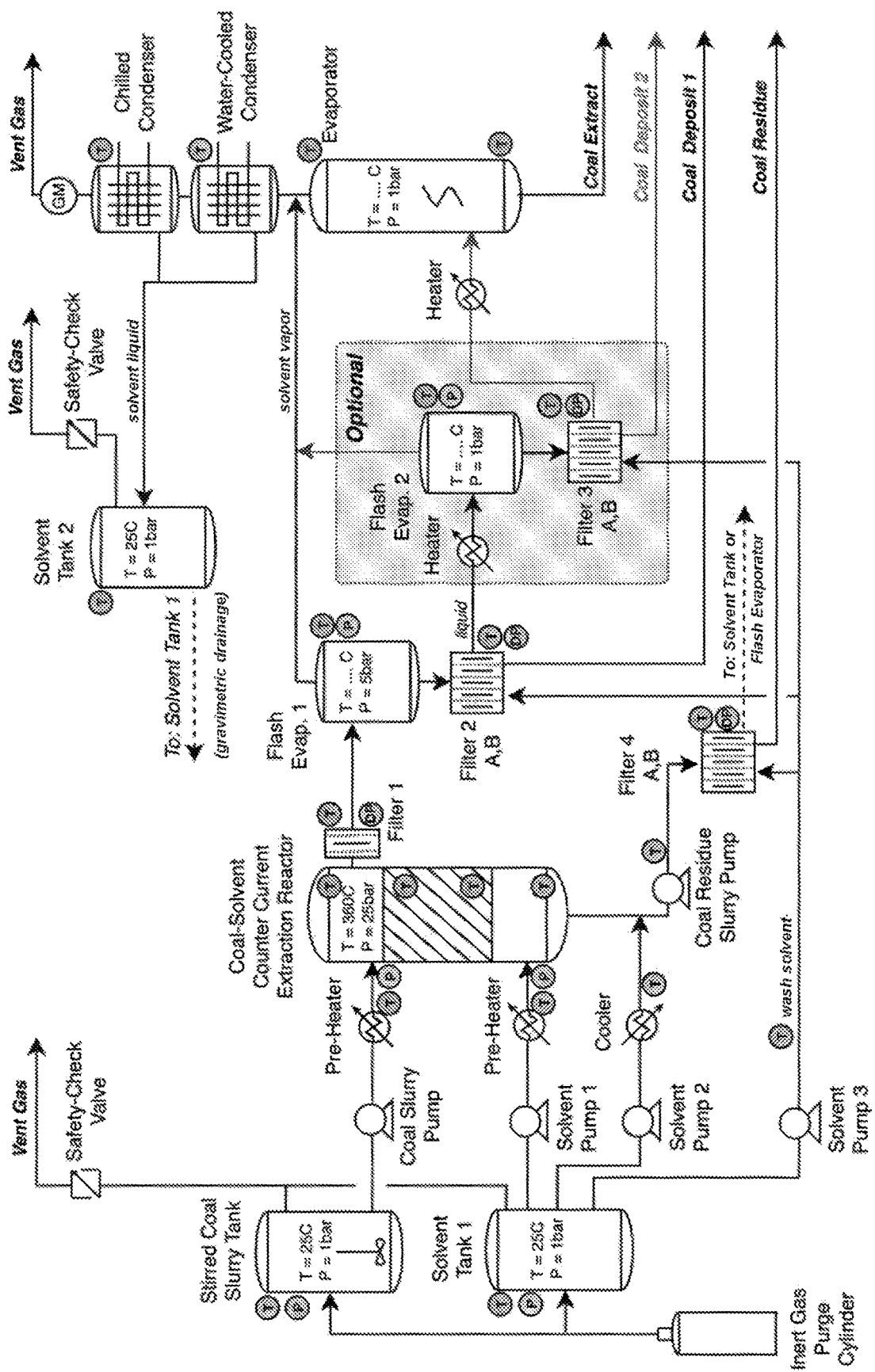
FIG. 9. Process flow diagram with approximate locations of temperature (T) and pressure (P) sensors is shown within the process flow diagram.

A schematic of an example uninterrupted filtering approach that continuously processes the product material stream(s) is shown in FIG. 8. In the main process flowsheet, the Filters 2, 3, and 4 essentially consist of two identical filtering devices (A, B) that are alternated into "filtration" and "washing" modes via synchronized 3-way valve switching. For instance, when a device A is filtering the solids containing solution, the device B is being washed and solids are cleaned out. Filtering is switched to device B, when DP cell shows certain pressure change, suggesting a sufficient product/cake build-up within the filter. The filtering operation can be ensured continuous because filtering cycle is anticipated to take much longer (e.g., 5× longer) than the product cleanout.

STATEMENTS REGARDING INCORPORATION BY REFERENCE AND VARIATIONS

All references, including publications, patent applications, and patents, cited herein are hereby incorporated by reference to the same extent as if each reference were individually and specifically indicated to be incorporated by reference and were set forth in its entirety herein.

PCT application no. PCT/US2018/050690, filed Sep. 12, 2018 and published as International Publication Application No. WO 2019/055529 on Mar. 21, 2019, is directed to systems, methods and process conditions for making high value products from feedstocks derived from coal, which is hereby incorporated by reference in its entirety to the extent nor inconsistent with the description herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references throughout this application, for example patent documents including issued or granted patents or equivalents; patent application publications; and non-patent literature documents or other source material; are hereby incorporated by reference herein in their entireties, as though individually incorporated by reference, to the extent each reference is at least partially not inconsistent with the disclosure in this application (for example, a reference that is partially inconsistent is incorporated by reference except for the partially inconsistent portion of the reference).

The terms and expressions which have been employed herein are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments, exemplary embodiments and optional features, modification and variation of the concepts herein disclosed may be resorted to by those skilled in the art, and that such modifications and variations are considered to be within the scope of this invention as defined by the appended claims. The specific embodiments provided herein are examples of useful embodiments of the present invention and it will be apparent to one skilled in the art that the present invention may be carried out using a large number of variations of the devices, device components, methods steps set forth in the present description. As will be obvious to one of skill in the art, methods and devices useful for the present methods can include a large number of optional composition and processing elements and steps.

When a group of substituents is disclosed herein, it is understood that all individual members of that group and all subgroups, including any isomers, are disclosed separately. When a Markush group or other grouping is used herein, all individual members of the group and all combinations and subcombinations possible of the group are intended to be individually included in the disclosure. When a compound is described herein such that a particular isomer of the compound is not specified, for example, in a formula or in a chemical name, that description is intended to include each isomers of the compound described individual or in any combination. Additionally, unless otherwise specified, all isotopic variants of compounds disclosed herein are intended to be encompassed by the disclosure. For example, it will be understood that any one or more hydrogens in a molecule disclosed can be replaced with deuterium or tritium. Isotopic variants of a molecule are generally useful as standards in assays for the molecule and in chemical and biological research related to the molecule or its use. Methods for making such isotopic variants are known in the art. Specific names of compounds are intended to be exemplary, as it is known that one of ordinary skill in the art can name the same compounds differently.

As used herein and in the appended claims, the singular forms "a", "an", and "the" include plural reference unless the context clearly dictates otherwise. Thus, for example, reference to "a cell" includes a plurality of such cells and equivalents thereof known to those skilled in the art. As well, the terms "a" (or "an"), "one or more" and "at least one" can be used interchangeably herein. It is also to be noted that the terms "comprising", "including", and "having" can be used interchangeably. The expression "of any of claims XX-YY" (wherein XX and YY refer to claim numbers) is intended to provide a multiple dependent claim in the alternative form, and in some embodiments is interchangeable with the expression "as in any one of claims XX-YY."

Many of the molecules disclosed herein contain one or more ionizable groups [groups from which a proton can be removed (e.g., —COOH) or added (e.g., amines) or which can be quaternized (e.g., amines)]. All possible ionic forms of such molecules and salts thereof are intended to be included individually in the disclosure herein. With regard to salts of the compounds herein, one of ordinary skill in the art can select from among a wide variety of available counterions those that are appropriate for preparation of salts of this invention for a given application. In specific applications, the selection of a given anion or cation for preparation of a salt may result in increased or decreased solubility of that salt.

Every formulation or combination of components described or exemplified herein can be used to practice the invention, unless otherwise stated.

Whenever a range is given in the specification, for example, a temperature range, a pressure range, a time range or a composition or concentration range, all intermediate ranges and subranges, as well as all individual values included in the ranges given are intended to be included in the disclosure. It will be understood that any subranges or individual values in a range or subrange that are included in the description herein can be excluded from the claims herein.

All patents and publications mentioned in the specification are indicative of the levels of skill of those skilled in the art to which the invention pertains. References cited herein are incorporated by reference herein in their entirety to indicate the state of the art as of their publication or filing date and it is intended that this information can be employed herein, if needed, to exclude specific embodiments that are in the prior art. For example, when composition of matter are claimed, it should be understood that compounds known and available in the art prior to Applicant's invention, including compounds for which an enabling disclosure is provided in the references cited herein, are not intended to be included in the composition of matter claims herein.

As used herein, "comprising" is synonymous with "including," "containing," or "characterized by," and is inclusive or open-ended and does not exclude additional, unrecited elements or method steps. As used herein, "consisting of" excludes any element, step, or ingredient not specified in the claim element. As used herein, "consisting essentially of" does not exclude materials or steps that do not materially affect the basic and novel characteristics of the claim. In each instance herein any of the terms "comprising", "consisting essentially of" and "consisting of" may be replaced with either of the other two terms. The invention illustratively described herein suitably may be practiced in the absence of any element or elements, limitation or limitations which is not specifically disclosed herein.

One of ordinary skill in the art will appreciate that starting materials, biological materials, reagents, synthetic methods, purification methods, analytical methods, assay methods, and biological methods other than those specifically exemplified can be employed in the practice of the invention without resort to undue experimentation. All art-known functional equivalents, of any such materials and methods are intended to be included in this invention. The terms and expressions which have been employed are used as terms of description and not of limitation, and there is no intention that in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims.

We claim:

1. A method of processing a coal-based feed stock to make a high value product, said method comprising:
   providing said coal-based feedstock, wherein said coal-based feedstock is at least partially derived from coal;
   contacting said coal-based feedstock with one or more solvents under solvent treatment conditions for generating a soluble phase product and a remainder insoluble phase product; and
   fractionating said soluble phase product generating at least two fractions under conditions such that at least one of said fractionated products is said high value product;
      wherein said fractionating comprises a partial precipitation, fractional crystallization, fractional freezing or any combination of these, thereby generating one or more one or more precipitated fractions and one or more remainder liquid phase fractions.

2. The method of claim 1, wherein said coal-based feedstock is at least partially derived from subbituminous coal.

3. The method of claim 1, wherein said coal-based feedstock is generated by thermal treatment of coal.

4. The method of claim 1, wherein said coal-based feedstock is generated by mechanical processing of coal.

5. The method of claim 1, wherein said one more solvents are tetralin (1,2,3,4-Tetrahydronaphthalene), 1-methylnaphthalene, dimethylformamide, dimethyl sulfoxide, toluene or any combination of these.

6. The method of claim 1, wherein said one or more solvents at least partial comprises one or more recycle streams derived from a coal treatment process, petrochemical process or any combination of these.

7. The method of claim 1, wherein said contacting step is carried out at a temperature greater than or equal 300° C.

8. The method of claim 1, wherein said contacting step is carried out at a temperature selected from the range of 300° C. to 500° C.

9. The method of claim 1, wherein said contacting step is carried out a super critical fluid conditions.

10. The method of claim 1, wherein said contacting step is a counter current extraction.

11. The method of claim 1, wherein said partial precipitation, fractional crystallization, or fractional freezing is carried out via flash precipitation.

12. The method of claim 1, further comprising isolating said one or more precipitated fractions from said one or more remainder liquid phase fraction.

13. The method of claim 1, wherein said precipitated fractions are isolated via filtration.

14. The method of claim 1, wherein cooling generates a plurality of precipitated fractions, wherein each precipitated fraction is characterized by a precipitation temperature range.

15. The method of claim 14, wherein said precipitation temperature ranges of said precipitated fraction ranges from 100° C. to 360° C.

16. The method of claim 1, wherein said fractionating step further comprises decreasing the amount of solvent in said soluble phase product prior to or during said partial precipitation, fractional crystallization, fractional freezing or any combination of these.

17. The method of claim 16, wherein the amount of solvent in said soluble phase product is decreased by flash evaporation.

18. The method of claim 1, further comprising thermally treating any of said precipitated fractions.

19. The method of claim 1, wherein said precipitated fractions include:
   one or more tetralin insoluble fractions and one or more a tetralin soluble fractions; and/or
   one or more a low molecular weight fractions characterized by a first average molecular weight range of 300±10% Da and one or more middle molecular weight fractions characterized by a second average molecular weight range of 350±10% Da and one or more high molecular weight fractions characterized by a third average molecular weight of 390±10% Da; and/or
   one or more low polycyclic aromatic hydrocarbon fractions having less than 100 ppm polycyclic aromatic hydrocarbon content; and/or
   one or more a high oxygen content fractions characterized by 78-82 wt. % carbon, 6-8 wt. % hydrogen, 0.6-1.2 wt. % nitrogen, 9-14 wt. % oxygen, and 0.4 to 0.5 wt. % sulfur.

20. The method of claim 1, wherein said high value products are one or more of: polymers or polymer precursors; asphaltenic intermediates and/or finished products; coal tar, distillates, pitch, bulk asphalt, paving asphalt, graphitic materials, carbon fibers, graphene; soil amendments; fertility products; building materials or any combinations of these.

21. The method of claim 1, wherein said high value products are polyurethanes, polyamides, polyesters, epoxy polymers or precursors thereof.

22. A method comprising:
   providing a coal-based feedstock, wherein said coal-based feedstock is at least partially derived from coal;
   contacting said coal-based feedstock with one or more solvents under solvent treatment conditions for generating a soluble phase product and a remainder insoluble phase product, wherein said contacting comprises a counter current extraction, the counter current extraction comprising:
      flowing a coal slurry in a first direction through a counter current extraction vessel, wherein the coal slurry comprises said coal based feedstock;
      flowing a solvent in a second direction through the counter current extraction vessel, the second direction being opposite to the first;
      wherein the solvent contacts the coal slurry in a series of chambers, the chambers being defined by static baffles, each chamber having at least one agitator paddle circulating therein; and
   fractionating said soluble phase product generating at least two fractions under conditions such that at least one of said fractionated products is said high value product.

23. A method of processing a coal-based feed stock to make a high value product, said method comprising:
   providing said coal-based feedstock, wherein said coal-based feedstock is at least partially derived from coal;
   contacting said coal-based feedstock with one or more solvents under solvent treatment conditions for generating a soluble phase product and a remainder insoluble phase product; and
   fractionating said soluble phase product generating at least two fractions under conditions such that at least one of said fractionated products is said high value product; and wherein said high value products are polyurethanes, polyamides, polyesters, epoxy polymers or precursors thereof.

\* \* \* \* \*